United States Patent
Livshits et al.

(10) Patent No.: US 9,064,289 B2
(45) Date of Patent: Jun. 23, 2015

(54) SERVICE MEDIATION MODEL

(75) Inventors: Mikhail Livshits, Canton, CT (US);
William Porter, Granby, MA (US);
Dana Spice, Belchertown, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 13/424,838

(22) Filed: Mar. 20, 2012

(65) Prior Publication Data
US 2013/0254254 A1 Sep. 26, 2013

(51) Int. Cl.
*G06F 15/173* (2006.01)
*G06Q 10/10* (2012.01)
*G06Q 50/10* (2012.01)

(52) U.S. Cl.
CPC ............... *G06Q 50/10* (2013.01); *G06Q 10/10* (2013.01)

(58) Field of Classification Search
USPC ....................................................... 709/226
See application file for complete search history.

(56) References Cited

U.S. PATENT DOCUMENTS

| | | | |
|---|---|---|---|
| 6,470,388 B1 * | 10/2002 | Niemi et al. ................... | 709/224 |
| 7,490,153 B1 | 2/2009 | Krishnan et al. | |
| 7,627,671 B1 * | 12/2009 | Palma et al. ................... | 709/224 |
| 7,664,782 B2 * | 2/2010 | Iba ................................ | 707/803 |
| 7,797,450 B2 | 9/2010 | Xie et al. | |
| 7,917,626 B2 | 3/2011 | Krishnan et al. | |
| 7,996,488 B1 | 8/2011 | Casabella et al. | |
| 8,037,122 B2 | 10/2011 | Saha et al. | |
| 8,055,775 B2 | 11/2011 | Channabasavaiah et al. | |
| 8,060,553 B2 | 11/2011 | Mamou et al. | |
| 8,458,143 B2 * | 6/2013 | Loven et al. ................... | 707/691 |
| 2004/0093381 A1 | 5/2004 | Hodges et al. | |
| 2004/0111468 A1 * | 6/2004 | Enomoto ...................... | 709/203 |
| 2006/0036463 A1 | 2/2006 | Patrick et al. | |
| 2006/0136573 A1 * | 6/2006 | Loven et al. ................... | 709/219 |
| 2006/0143686 A1 | 6/2006 | Maes | |
| 2008/0077652 A1 | 3/2008 | Grant et al. | |
| 2008/0091729 A1 * | 4/2008 | Iba .............................. | 707/104.1 |
| 2011/0145389 A1 | 6/2011 | You | |
| 2011/0238795 A1 | 9/2011 | Bauer et al. | |
| 2011/0295645 A1 | 12/2011 | Barros | |
| 2011/0295646 A1 * | 12/2011 | Barros ........................ | 705/7.26 |

FOREIGN PATENT DOCUMENTS

WO WO2008030513 A2 3/2008

OTHER PUBLICATIONS

Zeng, Lingzhao, et al. "Semantic Service Mediation" Service Oriented Computing—ICSOC 2006, Lecture Notes in Computer Science, 2006, vol. 4294/2006, p. 490-495.

* cited by examiner

*Primary Examiner* — Lance L Barry
(74) *Attorney, Agent, or Firm* — Goodwin Procter, LLP (57) ABSTRACT

Embodiments of the invention relate to processing service requests and responses using a service mediation model. A service transaction is received and one or more processing operations are performed on the service transaction. The one or more processing operations perform one or more operations on the service transaction based on requirements associated with a service consumer and a service provider associate with the service. The service transaction is transmitted once the processing operations are complete.

23 Claims, 5 Drawing Sheets

SERVICE MEDIATION MODEL

BACKGROUND

This invention relates generally to processing within a computing environment, and more particularly to processing service requests and service responses using a service mediation model.

The ubiquitous nature of networks in general, and the Internet in particular, along with the large amount of inexpensive computing power available in centralized computer systems has increasingly led to the centralization of computer work through services such as web services.

Generally service providers provide services to service consumers. The centralization of services leads to stringent requirements on both the service consumer and the service providers in order to ensure that the services are consumed regularly with a minimization of service disruption. Over time this leads to tight integration between service providers and service consumers which negates some of the benefit that centralized services provided, namely the ability to share a single service with multiple consumers. As service consumers and service providers created increasingly distinct and generalized services and applications, complexities in managing the relationships between service providers and the various service consumers due to varying requirements and standards has arisen.

BRIEF SUMMARY

Embodiments include a method, system, and computer program product for processing service requests and responses using a service mediation model. In an embodiment, a service transaction is received and one or more processing operations are performed on the service transaction. The one or more processing operations perform one or more operations on the service transaction based on requirements associated with a service consumer and a service provider associate with the service. The service transaction is transmitted once the processing operations are complete.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An embodiment of the present invention provides for a service mediation model.

In an embodiment, a service mediator operates under a service mediation model to customize, via parameterized configuration settings, the mediation services offered to particular service consumers based on the service consumer's requirements. In addition, the service mediation model provides parameterized configuration settings to offer customized support for various service providers.

Because of the increasing complexity of web services, and the increasing commoditization of services, a service mediator has been established. The service mediator provides a connection and translation service to assist a service consumer to consume services from a service provider. In an embodiment, a service mediator provides translation, authentication, and other mediation services for both the service provider and service consumer.

A service mediation model provides a comprehensive answer to issues of complexity in the service distribution and consumption cycle. The service mediation model applies not only in cases where consumers and providers are represented by automated, computer-based solutions but rather defines structure, sequences of steps and properties of mediation services applicable in variety of scenarios both automated and non-automated.

A company may expose a set of business services for consumption by service consumers. The company defines rules that any consumer that is interested in using the service must adhere to in order to be able to consume the services. In an embodiment, the rules are not part of the service and are not part of the consumer functionality. Some examples of rules are security based rules (i.e. who can access the service), and/or an enrichment of the request document sent by the consumer with data that is required by the service but is not obtainable from the consumer. This example applies both to native services, and also in cases where a company defines a service that is implemented by third party. This third party implementation embodiment may occur when service development has been outsourced. In these outsourcing scenarios, even though the company didn't create the service, the company still wants to define the rules to adhere to when the service is consumed.

In an embodiment, the service mediation model establishes three categories of mediation, request mediation, response mediation, and error mediation. Request mediation is a set of rules and policies that is applied to and conformed with during the processing of a request document from a service consumer to a service provider. Response mediation is a set of rules and policies that is applied to and conformed with during the processing of the response document between a service provider and a service consumer. Error mediation is a set rules and policies that are applied when rules and/or policies of the request/response mediation are violated, including instances where a service provider communicates a violation of its rules and standards or does not have the ability to fulfill the function of processing of the request.

In an embodiment, each of the mediation categories is defined as an ordered sequence of well-defined steps. Each step in a sequence includes a set of properties governing the type of mediation the step defines. Each property is applied in the context of particular consumer trying to call that particular service. Therefore the semantics of every property may vary based on who is the service consumer and who is the service provider. The properties may be implemented using any method known in the art. In an embodiment, properties are implemented as one or more parameters. In an embodiment, each parameter corresponds with one or more properties. At each step in the service mediation model, any policy or requirement for that step is applied to the service request, the service response, or to detected violation.

In an embodiment, the service mediation model includes metric collection. Each step of the service mediation model may collect its own metrics based on the type of mediation the step defines. The service mediation model collects metrics on entry to request/response rules and on exit of request/response rules. Metrics are collected on entry to the service in order to have a record of the incoming document in case execution of the rest of the service mediation model results in an unrecoverable failure. Metrics are collected upon the exit of the service request and response in order to have a record of what exactly was sent to the provider for processing, what was returned by the provider, and what was sent to the consumer after mediation logic was applied. The collected metrics may be used for variety of purposes such as troubleshooting, non-repudiation, etc.

In an embodiment, any of the properties of any of the steps can be turned off (i.e., disabled), which results in that particular property not applying to the step for which it was turned off. In an embodiment, the properties may be turned off based on a specific service requestor or service provider. For example, the integrity checking parameter of an incoming document in a validation step may be turned off in cases where the source of the document is deemed to be trusted by the business, and no additional checks are needed.

In an embodiment, every service request carries multiple identities. The service request may carry the identity of the consumer which is defined as an entity that issues service calls, (i.e., a person or an application). The service request may also carry identity facts about the end user, such as a user identifier (or ID) for the user. The service request may additionally include information about any abilities have been delegated to the requesting user by a third party with the third party indicator and any identifying facts included.

In an embodiment, every step in the service mediation model is capable of producing a notification event. The notification event is an event that is to be brought to someone's attention, such as support personnel, service consumers, service providers, and/or any other party as deemed appropriate. In an embodiment, the service mediation model issues notification events during each and every error processing event.

Figure 1:
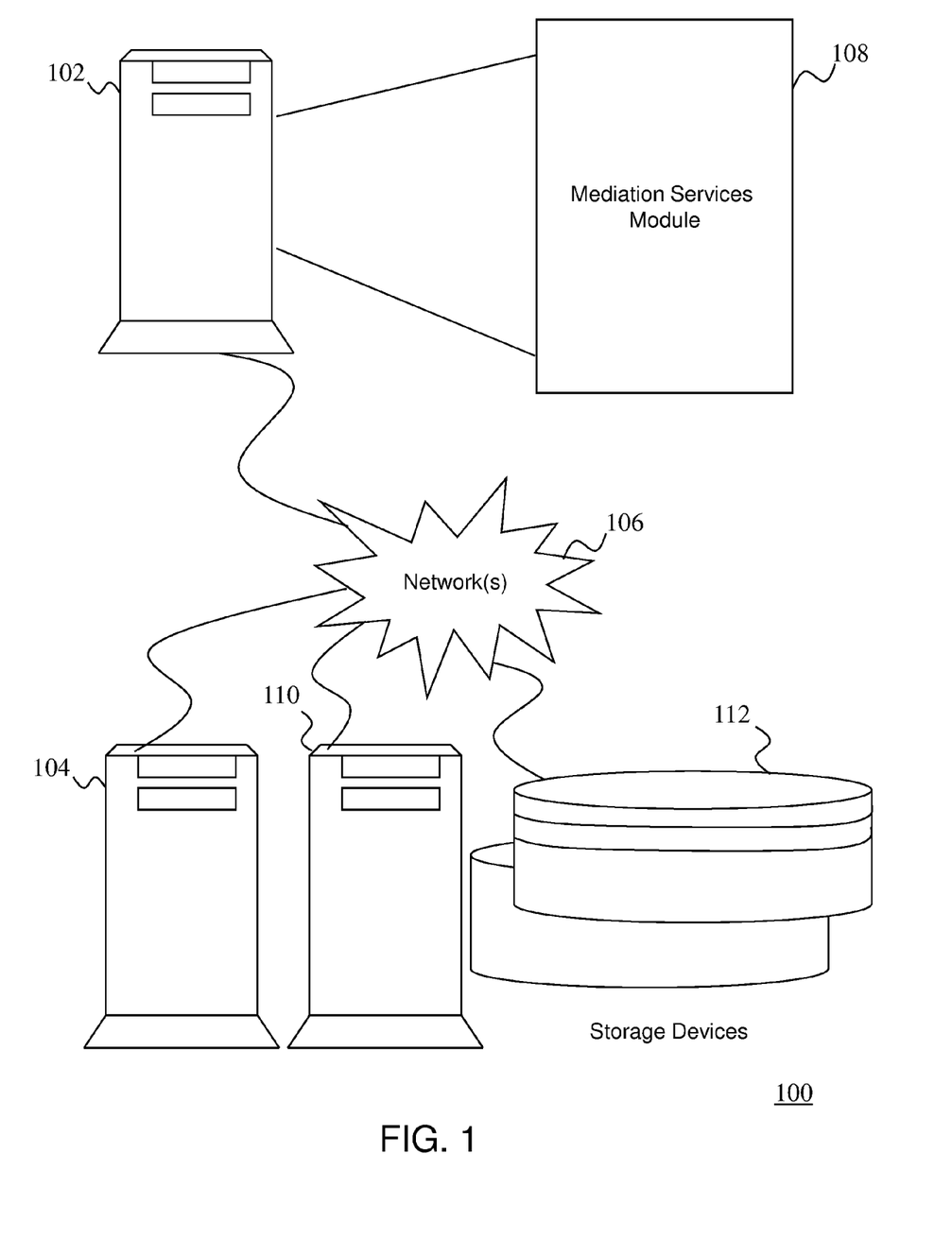
FIG. 1 depicts a schematic diagram of a system for performing service mediation according to a service mediation model that may be implemented by an embodiment.

Turning now to FIG. 1, a system 100 for implementing the service mediation model will now be described. In an embodiment, the system 100 includes a host system computer 102 executing computer instructions for the service mediation model. Host system computer 102 may operate in any type of environment that is capable of executing a software application. Host system computer 102 may comprise a high-speed computer processing device, such as a mainframe computer or an enterprise service bus (ESB) appliance, to manage the volume of operations governed by an entity for which the service mediation model is executing. In an embodiment, the host system computer 102 is part of an enterprise (e.g., a commercial business) that implements the service mediation model.

In an embodiment, the system 100 depicted in FIG. 1 includes one or more consumer systems 104 through which users at one or more geographic locations may initiate service requests. The one or more consumer systems 104 are coupled to the host system computer 102 via one or more networks 106. Each of the one or more consumer systems 104 may be implemented using a general-purpose computer executing a computer program for carrying out the processes described herein. The one or more consumer systems 104 may be personal computers (e.g., a lap top, a personal digital assistant, a mobile device) or computer servers. If the one or more consumer systems 104 are personal computers, the processing described herein may be shared by one of the one or more consumer systems 104 and the host system computer 102 (e.g., by providing a browser based graphical user interface to the one or more consumer systems 104). The one or more consumer systems 104 may be operated by authorized users (e.g., users authorized to exercise business functions exposed by the service) of the service mediation model described herein.

In an embodiment, the system 100 depicted in FIG. 1 also includes one or more provider systems 110, which provide services that are consumed by the one or more service consumer systems 104. The one or more provider systems 110 are coupled to the host system computer 102 via one or more networks 106. Each of the one or more provider systems 110 may be implemented using a general-purpose computer executing a computer program for carrying out the processes described herein. The one or more provider systems 110 may be host system computers, mainframe computers, virtual system computers, and/or computer servers. The one or more provider systems 110 may be operated by authorized users (e.g., users authorized to provide business functions exposed by the service) of the service mediation model described herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. One of the one or more consumer systems 104 may be coupled to the host system computer 102 through multiple networks (e.g., intranet and Internet) so that not all of the one or more consumer systems 104 are coupled to the host system computer 102 through the same network. One or more of the one or more consumer systems 104, the one or more service provider systems 110, and the host system computer 102 may be connected to the networks 106 in a wireless fashion. In one embodiment, the networks 106 include an intranet and one or more consumer systems 104 executing a user interface application (e.g., a web browser) to contact the host system computer 102 through the networks 106. In another embodiment, the one or more consumer systems 104, and/or the one or more provider systems 110 are connected directly (i.e., not through the networks 106) to the host system computer 102 and the host system computer 102 contains memory for storing data in support of the service mediation model. Alternatively, a separate storage device (e.g., storage device 112) may be implemented for this purpose.

In an embodiment, the storage device 112 includes a data repository with data relating to service mediation by the system 100, as well as other data/information desired by the entity representing the host system computer 102 of FIG. 1. The storage device 112 is logically addressable as a consolidated data source across a distributed environment that includes networks 106. Information stored in the storage device 112 may be retrieved and manipulated via the host system computer 102. In an embodiment, the storage device 112 includes one or more databases containing, e.g., service mediation model parameters, error notifications, metrics and corresponding configuration parameters, values, methods, and properties, as well as other related information as will be discussed more fully below. It will be understood by those of ordinary skill in the art that the storage device 112 may also comprise other structures, such as an XML file on the file system or distributed over a network (e.g., one of networks 106), or from a data stream from another server located on a network 106.

The host system computer 102 depicted in the system of FIG. 1 may be implemented using one or more servers operating in response to a computer program stored in a storage medium accessible by the server. The host system computer 102 may operate as a network server (e.g., a web server) to communicate with the one or more consumer systems 104 and the one or more provider systems 110. The host system computer 102 handles sending and receiving information to and from the one or more consumer systems 104 and the one or more provider systems 110 and can perform associated tasks. The host system computer 102 may also include a firewall to prevent unauthorized access to the host system computer 102 and enforce any limitations on authorized access. For instance, an administrator may have access to the entire system and have authority to modify portions of the system. A firewall may be implemented using conventional hardware and/or software as is known in the art.

The host system computer 102 may also operate as an application server. The host system computer 102 executes one or more computer programs to provide the service mediation model. The host system computer 102 includes a mediation services module 108. As previously described, it is understood that separate servers may be utilized to implement the network server functions and the application server functions. Alternatively, the network server, the firewall, and the application server may be implemented by a single server executing computer programs to perform the requisite functions.

It will be understood that the generation of the service mediation model described in FIG. 1 may be implemented in hardware, software executing on a general purpose computer, or a combination thereof.

Figure 2:
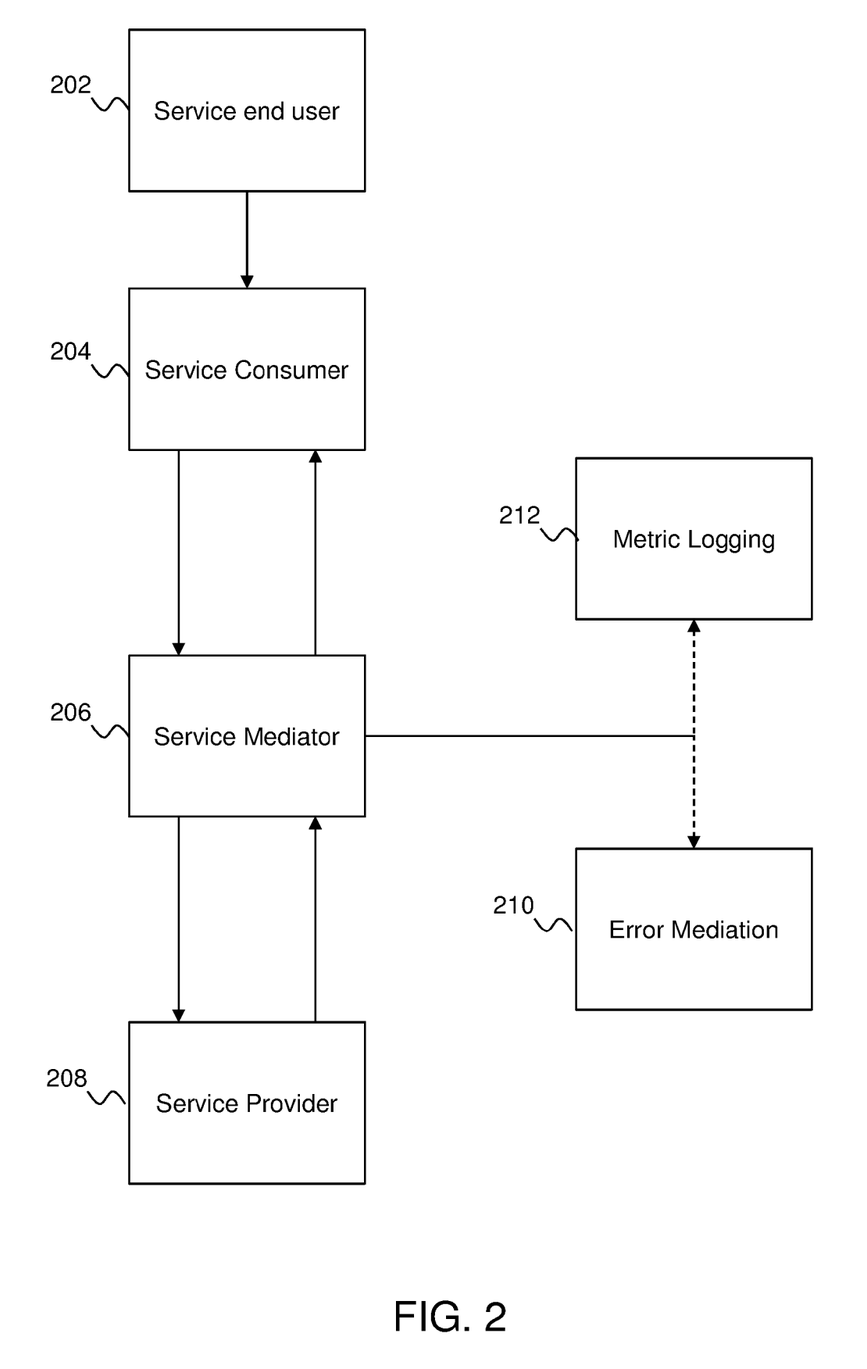
FIG. 2 depicts a schematic diagram of a system for processing system service requests and responses in an embodiment.

FIG. 2 depicts a schematic diagram of a system for processing system service requests and responses in an embodiment. In an embodiment, an end user 202 executes a function that requires a call to a service. In an embodiment, the end user 202 is executing an application that includes a mechanism for executing a service. In an additional embodiment, the end user 202 is executing an application that communicates over a network to an ancillary application that is capable of executing a service. An application that is capable of executing a service request, whether executed by the end user 202, or is accessed over a network, is a service consumer 204. The service consumer 204 submits a service requests that is directed to the service provider 208. The service request is first processed by a service mediator 206. In an embodiment, the service mediator 206 includes a mediation service module such as the mediation services module 108 of FIG. 1. The service mediator 206 processes the service requests as will be described in more detail below. After the service mediator 206 processes the service requests the service request is forwarded to the service provider 208. The service provider 208 processes the service request and returns a service response to the service mediator 206 that satisfies the service request. In an embodiment, the service response is a full response in accordance with the parameters provided in the service request. In an additional embodiment, if an error was encountered while processing the service request an error is returned that satisfies the service requirements as specified by the service provider 208. The service mediator 206 processes the service response as described in more detail below. The service mediator 206 sends the processed response to the service consumer 204. Any metrics collected by the service mediator 206 are logged by the metric logging module 212. In an embodiment, any errors captured by the service mediator 206 are processed by the error mediation module 210 as will be described in more detail below.

Although the elements of FIG. 2 include various connections, it will be understood that the configuration of the various modules and elements are provided for purposes of clarity only and are non-limiting. Any combination of more or fewer elements may be used or configured in any method known in the art. For example, in an embodiment, the service mediator 206 may include the metrics logging module 212, and the error mediation module 210.

Figure 3:
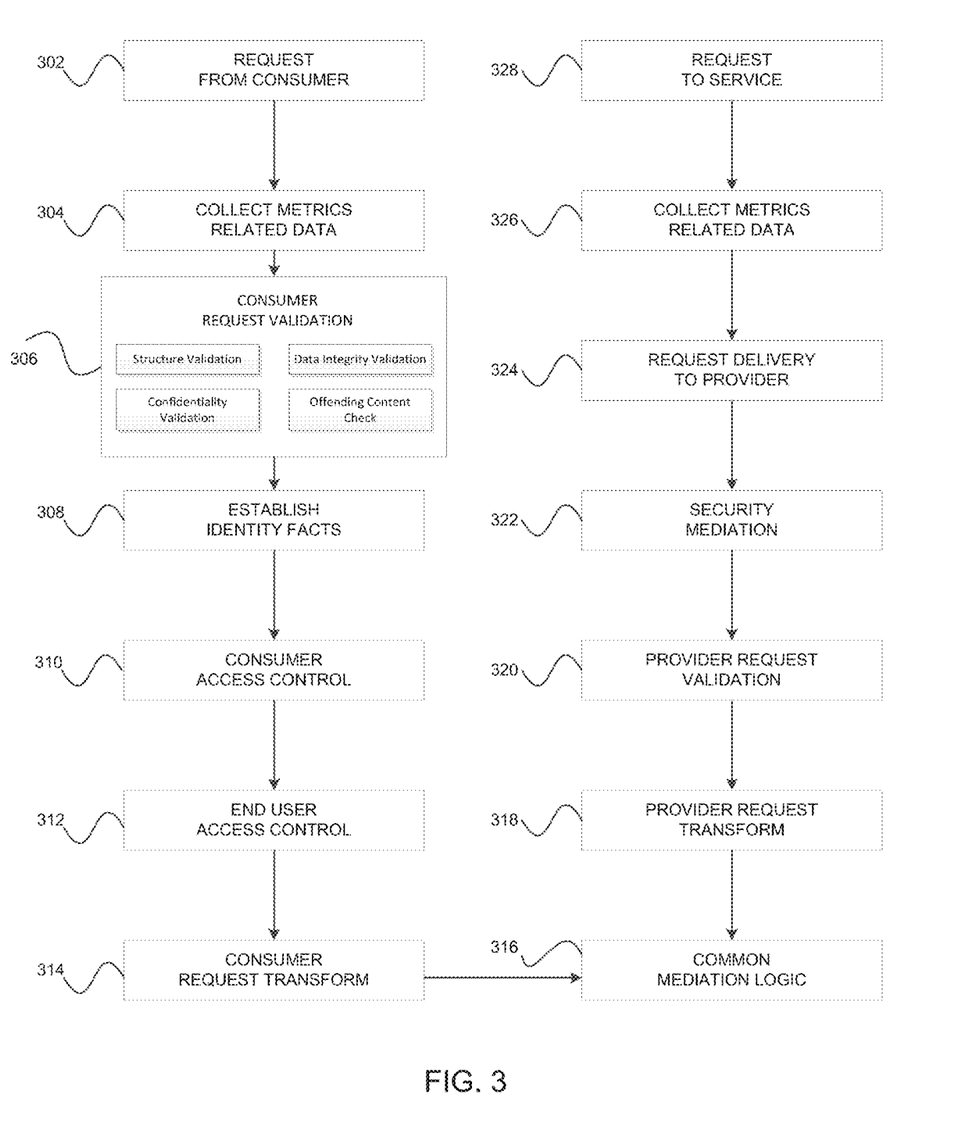
FIG. 3 depicts a process flow for a service request from a service consumer to a service provider in an embodiment.

FIG. 3 depicts a process flow for a service request from a service consumer to a service provider in an embodiment. In an embodiment, the request is sent from the service consumer 204 to the service provider 208 through the service mediator 206 of FIG. 2. At block 302, a request for a service is received from a consumer. In an embodiment, the request includes the information required for accessing the service (e.g. service name, service parameters, service provider, etc.) At block 304, metrics data that is related to the service request are collected. In an embodiment, the metrics include a timestamp of when the service request was received, copy of the request document as it was received by consumer, details of the connection over which request came (e.g., was the connection secure/not secure, which certificate was used to authenticate network location of consumer request), etc. The service mediator 206 collects the metrics and stores them in, for example, a database or file in a storage device, such as the storage device 112 of FIG. 1.

At block 306, the service request received from the consumer is validated. The validation process is used to establish that the request is in compliance with the various requirements that the service provider 208 has defined for this particular type of service request. The validation process includes a number of process steps that are configurable. In an embodiment, the validation process includes a property for verifying the structure of the service request. If the structure validation property is enabled, then the structure of the request is validated to ensure that it conforms to the requirements agreed to by the service consumer 204. For example, if the service provider 208 requires that the service request is an XML document, then the service request is validated to ensure that it is a valid XML document. If the structure validation property is not enabled, then the structure validation process is skipped.

In an embodiment, the request validation includes a property for enabling the verification of the data integrity of the service request. If the integrity validation property is enabled, then the integrity of the request is checked to ensure that it conforms to the requirements of the service mediator 206 and the service provider 208. For example, if the service mediator 206 or the service provider 208 requires one or more specific parameters, then the service request is checked to ensure that those required parameters have been supplied. If the integrity validation property is not enabled, then the integrity validation process is skipped.

In an embodiment, the request validation includes a property for enabling the verification of the confidentiality of the service request. If the confidentiality validation property is enabled, then the service request is checked to ensure that any data that in the payload of the request that must be encrypted has been encrypted by the service consumer 204. If the confidentiality validation property is not enabled, then the confidentiality validation process is skipped.

In an embodiment, the request validation includes a property for enabling verification that the data provided in the service request does not include malicious content. If the offending content check property is enabled, then the data in the service request is scanned to ensure that it does not include malicious material. If the offending content check property is not enabled, then the integrity validation process is skipped.

At block 308, the service mediator 206 establishes identity information (i.e. identity facts) about the service consumer 204 that has sent the service request, and the end user 202 that will consume the end result of the service request. An end user 202 may be a specific application, or a user of the application that initiated the service request via the web service consumer 204. In an embodiment, the identity of the consumer is used to identify specific consumer related logic to apply during the subsequent processing steps.

In an embodiment, the identity establishment step includes a property for enabling the identification of the source of the consumer identity information in the service request. If the source of consumer identification property is enabled, it indicates the location of the consumer's identity information (e.g., the incoming secure sockets layer (SSL) certificate used by the service consumer 204 to establish a connection to the mediation layer 206). If the source of the consumer identification property is not enabled, then it is assumed that the service consumer 204 is using a generic identifier or an identifier in some other predefined location.

In an embodiment, the identity establishment step additionally includes a property for enabling the identification of the source of the end user 202 identity information in the service request. If the source of the end user identification property is enabled, it indicates the location of the service consumer's 204's source information (e.g., the incoming secure sockets layer (SSL) certificate used by the service consumer 204 to establish a connection to the mediation layer 206). If the source of the consumer identification property is not enabled, then it is assumed that the service consumer 204 is using a generic source or that the source is in some other predefined location.

In an embodiment, the service consumer and the end user identity information may be substituted. This allows a set of clients to be grouped together under a single set of mediation policies and logic. The mediation policies allow for consumer identity substitution in order to be able to customize the mediation policies for a service consumer 204 based on the group that a service consumer 204 belongs to. In an embodiment, when the consumer identifier is used for access control, a group identity may be used once the service consumer 204 has been identified and determined based on consumer identification step rules that are the same as those required by the substituted identify. The identity establishment step includes properties that are configured to allow the service mediator 206 to substitute either or both of the consumer identity information, and the end user identity information. If the consumer identity substitution property is enabled, then the service mediator 206 may substitute the consumer identity information provided in the service request with values that it has established for the consumer. Likewise, if the end user identity substitution property is enabled, then the service mediator 206 may substitute the end user identity information provided in the service request with values that it has established for the end user 202.

At block 310, access control is established for the service consumer 204. The identity of the service consumer 204 or other part of the request identified as a source of authentication information is verified against an access control or authentication source in order to ensure that the service consumer 204 is authorized to access the service and the service provider 208. The access control step includes a property for enabling the establishment of the source of the authentication information. If the property is enabled, then the source of the authentication is established. The source of the authentication information may be a user id, user name, or other security token provided by a centralized authentication system, (e.g., LDAP, Kerberos, etc.)

At block 312, access control is established for the end user of the service. The identity of the end user of the service is verified against an access control or authentication source in order to ensure that the service user is authorized to access the service and the service provider 208. The access control step includes a property for enabling the establishment of the source of the authentication information. If the property is enabled, then the source of the authentication is established. The source of the authentication information may be a user id, user name, or other security token provided by a centralized authentication system, (e.g., LDAP, Kerberos, etc.)

At block 314, the service request is transformed. The transformation process transforms the service request received from the service consumer 204 into a service request that may be further processed by the service mediator 206. In an embodiment, a service provider 208 and service consumer 204 may each support distinct data formats, or even data structures, therefore the transformation from one format to the other assists with decoupling of the service consumer 204 and the service provider 208. The logic that is applied at the transformation is based on the requirements of the service provider 208, and any mediation rules as applicable to that service consumer 204 based on, for example, the service consumer's 204 identity, the request received from the service consumer 204, and the identities of the service provider 208 and the service consumer 204. The service request transformation step includes a property that is used to define which logic is applied during the transformation, and may be configured based on the specific service consumer 204 and the service provider 208.

At block 316, common mediation logic is applied to the transformed service request. The common mediation logic is logic that is applied to a request regardless of who the service consumer 204 or end user 202 is. The common mediation logic step includes a property that is used to define which logic is applied during at this step, and may be configured based on the service provider 208.

At block 318 the transformed service request is transformed in order to ensure that the request conforms to the service provider's requirements. The service request provider transformation step includes a property that is used to define which logic is applied during the provider transformation, and may be configured based on the specific service provider 208. In an embodiment, the transformation applies to all service requests regardless of the consumer.

At block 320, the transformed service request is validated. The validation process is used to establish that the request is in compliance with the various requirements that the service provider 208 has defined for its requests. The service provider validation process includes a number of process steps that are configurable. In an embodiment, the service provider validation includes a property for verifying the structure of the service request. If the structure validation property is enabled, then the structure of the request is validated to ensure that it conforms to the requirements of the service provider 208. For example, if the service provider 208 requires that the service request is an XML document, then the service request is validated to ensure that it is a valid XML document. If the structure validation property is not enabled, then the structure validation process is skipped.

In an embodiment, the request validation includes a property for enabling the verification of the data integrity of the service request. If the integrity validation property is enabled, then the integrity of the request is checked to ensure that it conforms to the requirements of the service provider 208. For example, if the service provider 208 requires one or more specific parameters, then the service request is checked to ensure that those required parameters have been supplied. If the integrity validation property is not enabled, then the integrity validation process is skipped.

In an embodiment, the request validation includes a property for enabling the verification of the confidentiality of the service request. If the confidentiality validation property is enabled, then the service mediation 206 ensures that any information in the service request is that must be encrypted is still encrypted after the mediation logic block 316 has been completed. In an embodiment, the service mediator re-encrypts the parts of the request that need to be encrypted. If the confidentiality validation property is not enabled, then the confidentiality validation process is skipped.

In an embodiment, the request validation includes a property for enabling verification that the data provided in the service request does not include offending content. If the offending content check property is enabled, then the data in the service request is scanned to ensure that it does not include offending material. If the offending content check property is not enabled, then the integrity validation process is skipped.

At block 322, security mediation is performed for the service request. A service provider 208 may require one or more artifacts that are generated from the service request. These artifacts are used by the service provider 208 for additional security verification and auditing, and are passed along with the service request. The artifacts are created based on the transformed service request. In an embodiment, the artifacts are appended to the request. In an alternate embodiment, the artifacts are sent separately from, but along with the service request. The security mediation step includes a property that is used to define which artifacts are required by the service provider 208.

At block 324, the request is prepared for delivery to the service provider 208. The preparation process includes determining if the service provider 208 is available to receive the service. A service provider 208 may be unavailable because of network disruptions between the service mediator 206 and the service provider 208, issues with the service provider application, issues with the service provider hardware, etc. The preparation step includes a property that is used to define whether the service mediator 206 should attempt to redeliver the service request at a later time if the service provider 208 is currently unavailable. If the redeliver property is enabled, then the service mediator 206 will attempt redelivery. In an embodiment, the preparation step additionally includes a configuration property to determine a retry schedule, number of retry attempts, etc. In addition, the parameter may be configured to reject the service request if the service provider 208 is unavailable.

At block 326, metrics related to the service mediation are collected. In an embodiment, the metrics include a timestamp of when the service mediation was completed, the amount of time elapsed during the mediation process, a copy of the request document as it was submitted to the service provider, details about the chosen destination (e.g., if a delivery step is trying to redeliver to alternate destination (i.e., an alternate URL) the metrics collection step makes a note of ultimate destination), any security artifacts that were chosen when communicating to destination such as certificates and other relevant contextual information, etc.

At block 328, the transformed service request is sent to the service provider 208 for processing. In an embodiment, if there are issues communicating with the service provider 208 and the delivery preparation step includes a policy for such a condition, the error mediation logic 210 may include re-invoking of the delivery preparation step in order to adequately deal with error as per policy specified by the step. In an additional embodiment, any error that occurs during the service mediation process is handled according to the error handling process described in more detail below. In an embodiment, each of the blocks described above are processed in a specific order, as described in FIG. 3. In an alternate embodiment, the blocks can be processed in any order.

Figure 4:
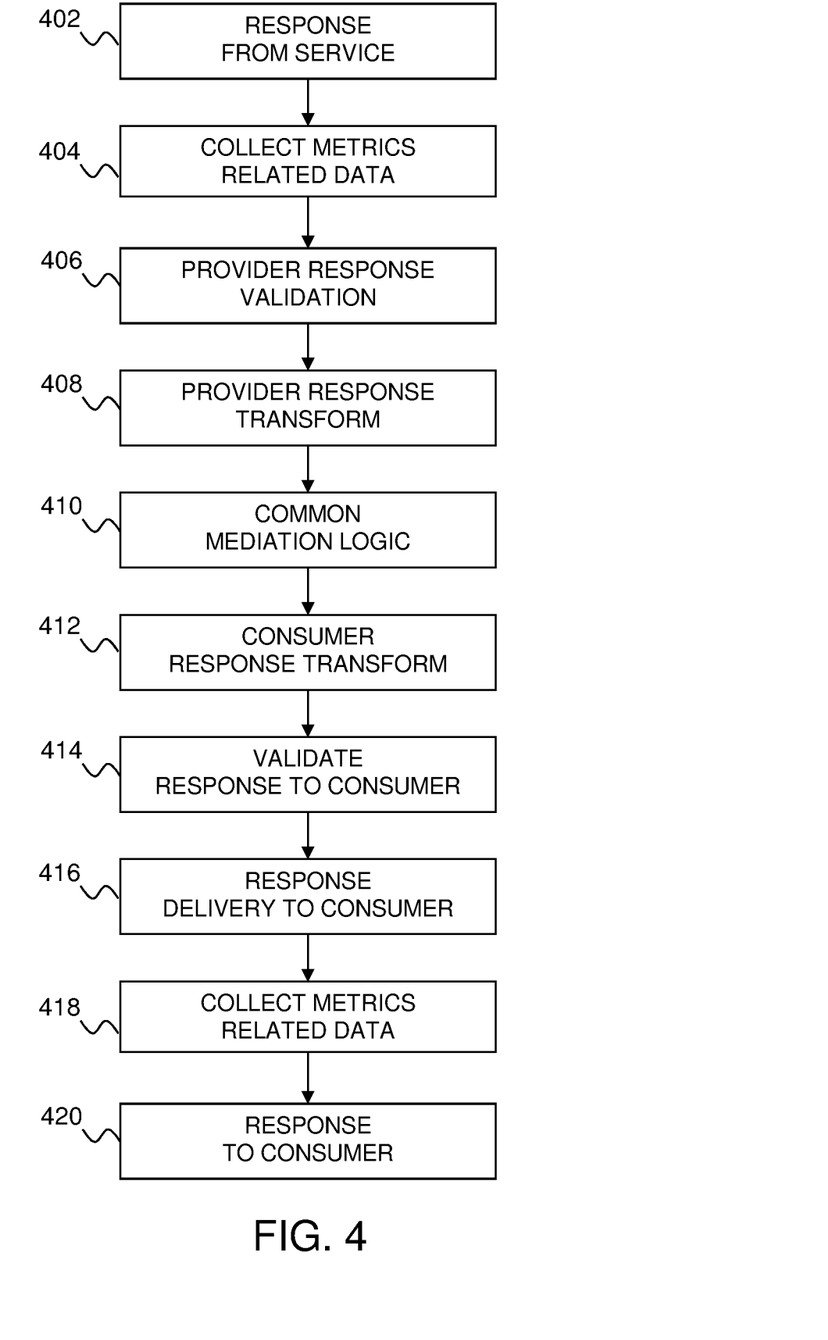
FIG. 4 depicts a process flow for a service response from a service provider to a service consumer in an embodiment.

FIG. 4 depicts a process flow for a service response from a service provider to a service consumer in an embodiment. In an embodiment, the service response is sent from the service provider 208 to the service consumer 204 through the service mediator 206 of FIG. 2. At block 402, a response for a service is received from a service provider 208. At block 404, metrics related to the service response are collect. In an embodiment, the metrics include a timestamp of when the service response was received, for a synchronous service request, the length of time it took for the response to be generated, a copy of the response as received from provider, etc. The service mediator 206, collects the metrics and stores them in, for example, a database or file in a storage device, such as the storage device 112 of FIG. 1.

At block 406, the service response received from the service provider 208 is validated. The validation process is used to establish that the response is in compliance with the various requirements that the mediation rules and service provider 208 have defined. The validation process includes a number of process steps that are configurable. In an embodiment, the validation includes a property for verifying the structure of the service response. If the structure validation property is enabled, then the structure of the response is validated to ensure that it conforms to the requirements of the service consumer 204. For example, if the service consumer 204 requires that the service response is an XML document, then the service response is validated to ensure that it is a valid XML document. If the structure validation property is not enabled, then the structure validation process is skipped.

In an embodiment, the response validation includes a property for enabling the verification of the data integrity of the service response. If the integrity validation property is enabled, then the integrity of the response is checked to ensure that it conforms to the requirements of the service consumer 204. For example, if the service consumer 204 requires one or more specific pieces of data, then the service response is checked to ensure that those required pieces of data have been supplied. If the integrity validation property is not enabled, then the integrity validation process is skipped.

In an embodiment, the response validation includes a property for enabling the verification of the confidentiality of the service response. If the confidentiality validation property is enabled, then if some parts of the response can be received/viewed only by the service consumer 204, then those parts are encrypted in a such a way that only authorized receiver can decrypt them, service mediator 206 will either check that particular data items are encrypted. If the confidentiality validation property is not enabled, then the confidentiality validation process is skipped.

In an embodiment, the response validation includes a property for enabling verification that the data provided in the service response does not include offending content such as offensive language. If the offending content check property is enabled, then the data in the service response is scanned to ensure that it does not include offending material. If the offending content check property is not enabled, then the integrity validation process is skipped.

At block 408, the service response is transformed. The transformation process transforms the service response received from the service provider 208 into a response that may be further processed by the service mediator 206. As stated above, in an embodiment, a service provider 208 and service consumer 204 may each support distinct data formats, or even data structures, therefore the transformation from one format to the other assists with decoupling of the service consumer 204 and the service provider 208. The logic that is applied at the transformation is based on the response received from the service provider 208, and the identities of the service provider 208. The service response transformation step includes a property that is used to define which logic is applied during the transformation, and may be configured based on the specific service consumer 204 and the service provider 208.

At block 410, common mediation logic is applied to the transformed service response. The common mediation logic is logic that is applied to a response regardless of who the service provider 208, service consumer 204 or end user 202 is. The common mediation logic step includes a property that is used to define which logic is applied during at this step, and may be configured based on the service provider 208.

At block 412 the transformed service response maybe transformed again in order to ensure that the response conforms to the service consumer's requirements. The service response consumer transformation step includes a property that is used to define which logic is applied during the consumer transformation, and may be configured based on the specific service consumer 204.

At block 414, the transformed service response is validated. The validation process is used to establish that the response is in compliance with the various requirements that the service consumer 204 has defined for the responses that it expects to receive. The service consumer validation process includes a number of process steps that are configurable. In an embodiment, the service consumer validation includes a property for verifying the structure of the service response. If the structure validation property is enabled, then the structure of the response is validated to ensure that it conforms to the requirements of the service consumer 204. For example, if the service consumer 204 requires that the service response is an XML document, then the service response is validated to ensure that it is a valid XML document. If the structure validation property is not enabled, then the structure validation process is skipped.

In an embodiment, the response validation includes a property for enabling the verification of the data integrity of the service response. If the integrity validation property is enabled, then the integrity of the request is checked to ensure that it conforms to the requirements of the service. For example, if the service consumer 204 requires one or more specific data elements, then the service response is checked to ensure that those required data elements have been supplied. If the integrity validation property is not enabled, then the integrity validation process is skipped.

In an embodiment, the response validation includes a property for enabling the verification of the confidentiality of the service response. If the confidentiality validation property is enabled, then if parts of the message may only be received/viewed by authorized recipient this step ensures that such a data item whether originally received from the service or added during mediation are encrypted appropriately. If the confidentiality validation property is not enabled, then the confidentiality validation process is skipped.

In an embodiment, the response validation includes a property for enabling verification that the data provided in the service response does not include offending content. If the offending content check property is enabled, then the data in the service response is scanned to ensure that it does not include offending material. If the offending content check property is not enabled, then the integrity validation process is skipped.

At block 416, the response is prepared for delivery to the service consumer 204. The preparation process includes determining how the service consumer 204 expects to receive the response. A service consumer 204 may expect a synchronous response (i.e., a response that is returned from the service provider 208 as single transaction without disconnecting) or an asynchronous response (i.e. a response that is returned from the provider at a later time through, for example, a subsequent procedure call to the service consumer 204, a service consumer database flag update, etc.) The response preparation step includes a response delivery option property that may be configured to indicate which type of response the service consumer 204 expects, and, if the preferred response is asynchronous, what mechanism the service mediator 206 should use to transmit the response to the service consumer 204.

At block 418, metrics related to the service mediation are collected. In an embodiment, the metrics include a timestamp of when the service mediation was completed, the amount of time elapsed during the mediation process, a copy of the document sent out to the consumer, a property of connection the document is sent out (e.g., secure/non-secure), which certificate was used, etc.

At block 420, the transformed service response is sent to the service consumer 204 based on the service response deliver options set at block 416 above. In an embodiment, any error that occurs during the service mediation process is handled according to the error handling process described in more detail below. In an embodiment, each of the blocks described above are processed in a specific order, as described in FIG. 4. In an alternate embodiment, the blocks can be processed in any order.

Figure 5:
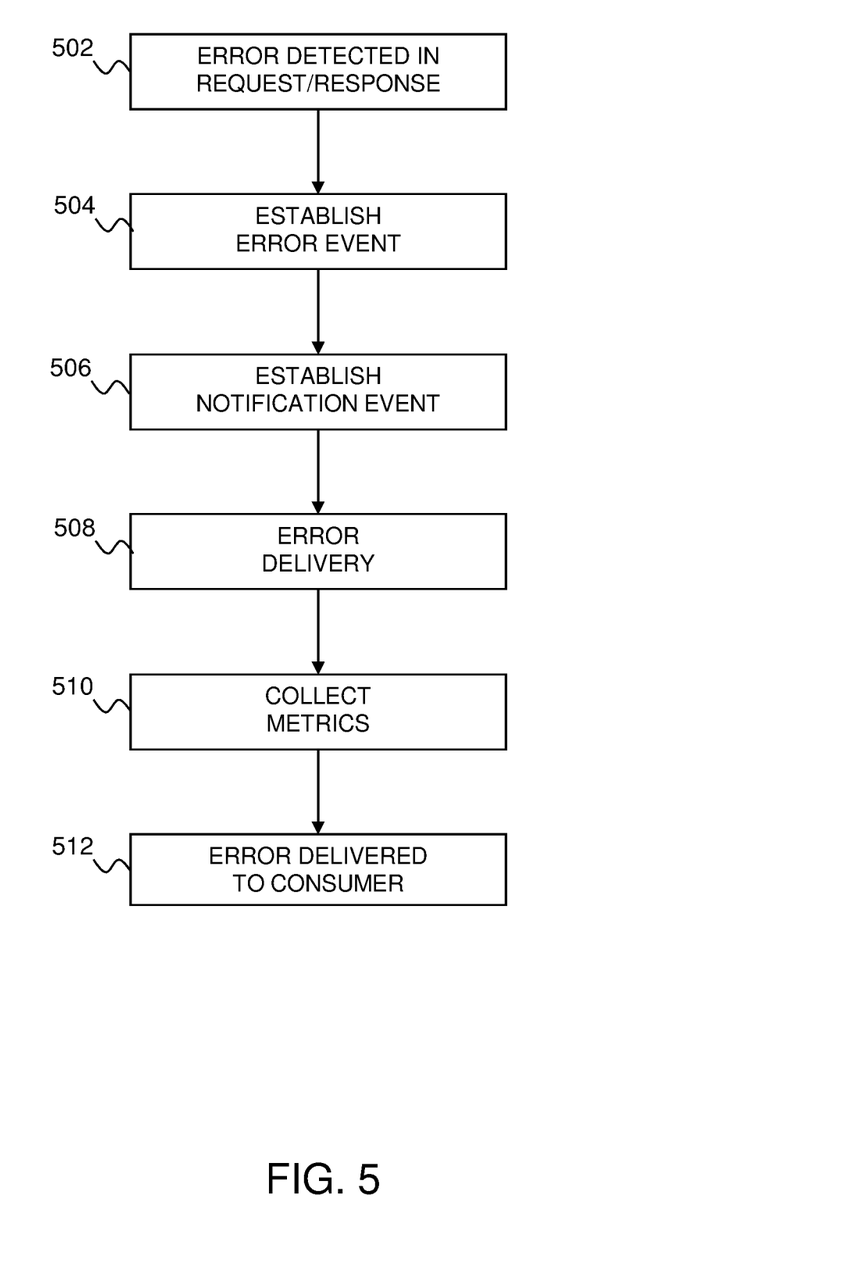
FIG. 5 depicts a process flow for handling errors that occur during service mediation in an embodiment.

FIG. 5 depicts a process flow for handling errors that occur during service mediation in an embodiment. In an embodiment, the errors are managed in the error mediation module 210 of FIG. 2. At block 502, an error is detected during the mediation process. In an embodiment, the error may occur while processing either a request or a response.

At block 504, an error event is established. The error event establishment causes logic to be executed that is configured using an error establishment property. The error establishment property includes logic for gather all required error data including the error description, the execution context of the error, any error messages, any error dumps, etc.

At block 506, a notification event is established. The notification event is used to prepare information that will be sent to the service consumer 204 and/or the service provider 208 to indicate that an error has occurred. The notification event establishment step includes a number of properties for controlling the notification of the error condition. The notification event establishment step includes event detail gathering logic. The event detail gathering logic includes logic for gather all required error data including the error description, the execution context of the error, any error messages, any error dumps, etc.

The notification event establishment step additionally includes an event classification property. The event classification property includes logic for categorizing the event notification including determining the type of error that occurred, and the priority level of the error. This information allows the service consumer 204 to propagate the error according to its severity and importance.

At block 508, the error notification is prepared for delivery to the service consumer 204 and/or the service provider 208. The error notification delivery preparation step includes error transformation logic. The error transformation logic may be configured to transform error notification into a format that is acceptable to a specific service consumer 204. This logic includes, for example, where and how the message should be delivered, the error message format, etc. In an embodiment, it is also determined if any additional parties need to receive error notifications.

At block 510, metrics related to the error processing are collected. In an embodiment, the metrics include a timestamp of when the error processing was completed, the amount of time elapsed during the error processing, a description of errors as detected by particular error processing logic (e.g., error code(s), error message(s), contextual information such as at which step error happened), etc.

At block 512, the error notification is transmitted to the service consumer 204, and/or the service provider 208. In an embodiment, each of the blocks described above are processed in a specific order, as described in FIG. 5. In an alternate embodiment, the blocks can be processed in any order.

Technical effects and benefits include a configurable service mediation layer. The configurable service mediation layer may be configured to provide a number of individual processing steps for a service request and a service response. Each of these steps has one or more configurable properties, these configurable properties allow for customization of each of the steps based on one or more of the service consumer, the service end user, and the service provider. The configurable service mediation layer additionally includes error handling processing logic. The error handling processing logic is configurable based on the web service consumer and the service provider. The configurable service mediation layer additionally includes metrics collection logic for collecting one or more metrics for the request and response processing, as well as the error handling aspects of the configurable service mediation layer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for executing a service mediator mediation model, the method comprising:
   receiving, by a computer, a service transaction being a service response received from a service provider;
   performing, by the computer, one or more processing operations on the service transaction, the one or more processing operations configured to perform one or more operations on the service transaction based on at least one requirement associated with a service consumer and the service provider, wherein the one or more processing operations includes a set of properties, said properties based on the service consumer and the service provider;
   performing one or more transformations, comprising:
   transforming the service response to conform to data requirements of the service consumer; and
   applying, to the service response, rules provided by the service consumer; and
   transmitting the service transaction responsive the performing of one or more processing operations.

2. The method of claim 1, wherein the performing comprises validating the service response, the validating based on requirements of the service provider and comprising one or more of:
   structure validation;
   data integrity validation;
   confidentiality validation; and
   an offending content check.

3. The method of claim 1, further comprising collecting one or more metrics, the one or more metrics including one or more of:
   an amount of processing time for processing the service transaction;
   error information;
   connection information; and
   a copy of the service transaction.

4. The method of claim 1, further comprising error processing logic for handling errors during the processing.

5. The method of claim 4, wherein the error processing logic is configured to perform one or more operations based on requirements associated to the service consumer and the service provider.

6. The method of claim 5, wherein the one or more operations comprises one or more of:
   establishing an error event;
   establishing a notification event; and
   delivering an error to the service consumer.

7. The method of claim 1, wherein the one or more processing operations are performed in a specific order.

8. A system comprising:
   a computer processor configured to execute a service mediator mediation model, the service mediator mediation model performing:
   receiving a service transaction being a service request received from a service consumer;

performing, by the computer, one or more processing operations on the service transaction, the one or more processing operations configured to perform one or more operations on the service transaction based on at least one requirement associated with the service consumer and a service provider and configured to establish identity information about the service request, the establishing comprising one or more of:
    identifying a source of a service consumer's identity information;
    identifying a source of an end user's identity information;
    determining whether the service consumer's identity information is to be substituted; and
    determining whether the end user's identity information is to be substituted, and
wherein the one or more processing operations includes a set of properties, said properties based on the service consumer and the service provider; and
transmitting the service transaction responsive the performing of one or more processing operations.

9. The service of claim 8, wherein the performing comprises validating the service request, the validating based on requirements of the service consumer and comprising one or more of:
    structure validation;
    data integrity validation;
    confidentiality validation; and
    an offending content check.

10. The service of claim 8, wherein the performing further comprises performing access control, the access control comprising one or more of:
    determining whether the service consumer is authenticated and authorized to execute the service request; and
    determining whether an end user of the service request is authenticated and authorized to execute the service request.

11. The service of claim 8, wherein the performing further comprises performing one or more transformations, the one or more transformations comprising:
    transforming the service request to conform to data requirements of the service provider; and
    applying, to the service request, rules provided by the service provider.

12. The service of claim 8, further comprising collecting one or more metrics, the one or more metrics including one or more of:
    an amount of processing time for processing the service transaction;
    error information;
    connection information; and a copy of the service transaction.

13. The service of claim 8, further comprising error processing logic for handling errors during the processing.

14. The service of claim 13, wherein the error processing logic is configured to perform one or more operations based on requirements associated to the service consumer and the service provider.

15. The service of claim 14, wherein the one or more operations comprises one or more of:
    establishing an error event;
    establishing a notification event; and
    delivering an error to the service consumer.

16. The service of claim 8, wherein the one or more processing operations are performed in a specific order.

17. A computer program product for executing a service mediator mediation model at a processor, the computer program product comprising:
    a tangible non-transitory storage medium readable by a processing circuit and storing instructions for execution by the processing circuit for performing a method comprising:
    receiving, by a computer, a service transaction being a service response received from a service provider;
    performing, by the computer, one or more processing operations on the service transaction, the one or more processing operations configured to perform one or more operations on the service transaction based on at least one requirement associated with a service consumer and the service provider, wherein the one or more processing operations includes a set of properties, said properties based on the service consumer and the service provider;
    performing one or more transformations, the one or more transformations comprising:
    transforming the service response to conform to data requirements of the service consumer; and
    applying, to the service response, rules provided by the service consumer; and
    transmitting the service transaction responsive the performing of one or more processing operations.

18. The computer program product of claim 17, wherein the performing comprises validating the service response, the validating based on requirements of the service provider and comprising one or more of:
    structure validation;
    data integrity validation;
    confidentiality validation; and
    an offending content check.

19. The computer program product of claim 17, further comprising collecting one or more metrics, the one or more metrics including one or more of:
    an amount of processing time for processing the service transaction;
    error information;
    connection information; and
    a copy of the service transaction.

20. The computer program product of claim 17, further comprising error processing logic for handling errors during the processing.

21. The computer program product of claim 20, wherein the error processing logic is configured to perform one or more operations based on requirements associated to the service consumer and the service provider.

22. The computer program product of claim 21, wherein the one or more operations comprises one or more of:
    establishing an error event;
    establishing a notification event; and
    delivering an error to the service consumer.

23. The computer program product of claim 17, wherein the one or more processing operations are performed in a specific order.

* * * * *